(12) United States Patent
Rajapakse

(10) Patent No.: US 10,097,902 B2
(45) Date of Patent: Oct. 9, 2018

(54) SYSTEM AND METHOD FOR USING MULTIPLE AUDIO INPUT DEVICES FOR SYNCHRONIZED AND POSITION-BASED AUDIO

(71) Applicant: Blackfire Research Corporation, San Francisco, CA (US)

(72) Inventor: Ravi Rajapakse, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 31 days.

(21) Appl. No.: 15/358,103

(22) Filed: Nov. 21, 2016

(65) Prior Publication Data

US 2017/0127145 A1    May 4, 2017

Related U.S. Application Data

(63) Continuation-in-part of application No. 15/147,626, filed on May 5, 2016, now abandoned, which is a (Continued)

(51) Int. Cl.

| | |
|---|---|
| *G06F 3/00* | (2006.01) |
| *H04N 21/61* | (2011.01) |
| *H04W 4/00* | (2018.01) |
| *H04W 4/02* | (2018.01) |
| *H04M 1/725* | (2006.01) |

(Continued)

(52) U.S. Cl.

CPC ...... *H04N 21/6125* (2013.01); *H04M 1/7253* (2013.01); *H04N 21/4394* (2013.01); *H04N 21/4524* (2013.01); *H04N 21/85406* (2013.01); *H04R 3/005* (2013.01); *H04R 29/006* (2013.01); *H04W 4/008* (2013.01); *H04W 4/023* (2013.01); *H04W 4/80* (2018.02); *H04R 2430/21* (2013.01)

(58) Field of Classification Search
None
See application file for complete search history.

(56) References Cited

U.S. PATENT DOCUMENTS 8,190,998 B2 *   5/2012   Bitterlich .............. G06F 3/0486
                                                                           345/619
8,320,596 B2 * 11/2012   Ishibashi ................ H04R 1/403
                                                                           381/182

(Continued)

FOREIGN PATENT DOCUMENTS

| EP | 2963521 A1 | 1/2016 |
|---|---|---|
| WO | 2012047997 A1 | 4/2012 |

*Primary Examiner* — Elias Mamo
(74) *Attorney, Agent, or Firm* — Galvin Patent Law LLC; Brian R. Galvin

(57) ABSTRACT

A system for operating multiple audio input devices for synchronized and position-based audio comprising a media computing device comprising a processor, a memory, wireless network interfaces, a data store, a virtual screen driver, audio input devices connected to the media computing device, each comprising at least a microphone, and audio output devices connected to the media computing device, comprising at least a speaker, and an audio controller further comprising an operating system, an interaction manager and a synchronization manager configured to synchronize a series of audio stream inputs into a singular audio output.

16 Claims, 11 Drawing Sheets

Related U.S. Application Data continuation-in-part of application No. 15/178,544, filed on Jun. 9, 2016.

(60) Provisional application No. 62/157,474, filed on May 6, 2015, provisional application No. 62/328,562, filed on Apr. 27, 2016.

(51) Int. Cl.
*H04N 21/45* (2011.01)
*H04N 21/439* (2011.01)
*H04N 21/854* (2011.01)
*H04R 3/00* (2006.01)
*H04R 29/00* (2006.01)
*H04W 4/80* (2018.01)

(56) References Cited

U.S. PATENT DOCUMENTS

| | | | |
|---|---|---|---|
| 9,084,058 B2* | 7/2015 | Reilly | H04R 27/00 |
| 2011/0286609 A1* | 11/2011 | Faller | H04R 3/005 |
| | | | 381/92 |
| 2015/0039302 A1* | 2/2015 | Jarvinen | G10L 15/142 |
| | | | 704/232 |
| 2015/0170327 A1 | 6/2015 | Feldman et al. | |
| 2015/0178227 A1 | 6/2015 | Salmela et al. | |
| 2015/0264626 A1 | 9/2015 | Perdomo | |
| 2015/0286716 A1* | 10/2015 | Snibbe | G06F 17/30026 |
| | | | 707/610 |
| 2015/0310870 A1* | 10/2015 | Vouin | G11B 27/031 |
| | | | 704/500 |

\* cited by examiner

SYSTEM AND METHOD FOR USING MULTIPLE AUDIO INPUT DEVICES FOR SYNCHRONIZED AND POSITION-BASED AUDIO

CROSS-REFERENCE TO RELATED APPLICATIONS

This application is a continuation-in-part of U.S. patent application Ser. No. 15/178,544, titled "MEDIA COMPUTING DEVICE WITH MULTIPLE VIRTUAL SCREENS AND PERSONAL AREA NETWORK CAPABILITY", filed on Jun. 9, 2016, which claims the benefit of, and priority to, U.S. patent application Ser. No. 62/328,562, titled "MEDIA COMPUTING DEVICE WITH MULTIPLE VIRTUAL SCREENS", filed on Apr. 27, 2016, and is also a continuation-in-part of U.S. patent application Ser. No. 15/147,626, titled "MULTIPLE MICROPHONES FOR SYNCHRONIZED VOICE INTERACTION", filed on May 5, 2016 which claims the benefit of, and priority to, expired U.S. application Ser. No. 62/157,474, titled "MULTIPLE MICROPHONES FOR SYNCHRONIZED VOICE INTERACTION", filed on May 6, 2015, the entire specification of each of which is incorporated herein by reference in its entirety.

BACKGROUND OF THE INVENTION

Field of the Art

The disclosure relates to the field of audio input, and more particularly to the field of using multiple microphones for synchronized voice interaction with electronic devices.

Discussion of the State of the Art

In the field of audio input, it is a common practice to utilize multiple microphones for noise cancellation or echo reduction during audio recording. By positioning multiple microphones, audio may be "heard" from various positions and orientations to allow software or hardware processing to account for variations such as echoes, reverberation, or other acoustic anomalies, enhancing the quality of recorded audio data. As speech-capable technologies have developed such as virtual assistant software programs like Apple SIRI™, these noise cancellation functions have been important in improving the usefulness of such interaction technologies by improving the recognition of spoken audio and removing unwanted audio to reduce "false positives".

No current technology exists to utilize multiple microphones for synchronized audio interaction with such technologies, however. Synchronized audio would enable the use of multiple microphones to allow a user to move about a space while interacting naturally with a virtual assistant, for example. Multiple microphones may also be used to enable multiple participants to interact with a single speech-interaction technology simultaneously, something that is not possible in current implementations. Additionally, the use of multiple microphones as well as multiple speakers or other output devices, may enhance an overall user experience during interaction by enabling a user to freely "talk to a whole room", where they may speak naturally from any position or orientation, and hear responses and feedback regardless of their location within a space. Current implementations do not allow for such use, and generally require a user to speak toward a listening device such as a smartphone or a stationary microphone in order to ensure optimum performance, and this operation inhibits natural interaction by breaking the user out of their normal activity whenever they wish to speak to the device.

What is needed, is a system and method to operate multiple microphones for synchronized audio interaction, and to utilize synchronized audio feedback for enhanced interaction with speech-interaction technologies.

SUMMARY OF THE INVENTION

Accordingly, the inventor has conceived and reduced to practice, in a preferred embodiment of the invention, a system and method for using multiple audio input devices for synchronized and position-based audio. The following non-limiting summary of the invention is provided for clarity, and should be construed consistently with embodiments described in the detailed description below.

The invention offers a system and methods for utilizing multiple audio input devices for synchronized and position-based audio, to accommodate spatial distribution of microphones or users and account for changes in audio properties as the spatial distribution changes in real-time. Microphones may be connected via wired or wireless connections in various arrangements, such as on a user's mobile device communicating over a network or using multiple wired microphones position around a space.

According to a preferred embodiment of the invention, a media computing device with multiple audio input devices, comprising: a processor; a memory; an high definition media controller operating a high definition media interface; a plurality of wireless network interfaces, comprising at least a wireless network interface configured to communicate via a local area network; an audio controller configured to transmit audio content for rendering via at least the high definition media interface; and an operating system comprising programming instructions stored in the memory and operating on the processor and configured to: receive audio input streams from a plurality of audio input devices; analyze at least a portion of the received audio input streams; direct operation of the audio controller based at least in part on the analysis; wherein the high definition media interface is physically coupled by insertion into a high definition media input port of the high definition media display device, is disclosed.

According to another preferred embodiment of the invention, a media computing device with multiple virtual screens, comprising: a processor; a memory; an high definition media controller operating a high definition media interface; a plurality of wireless network interfaces, comprising at least a wireless network interface configured to communicate via a local area network; an audio controller; a virtual screen driver; and an operating system comprising programming instructions stored in the memory and operating on the processor and configured to: send screen graphics via the virtual screen driver to a plurality of mobile devices; send media content to a high definition media display device via the high definition media controller and the high definition media interface; and receive user interaction events from a mobile device via the wireless network interface; wherein the high definition media interface is physically coupled by insertion into a high definition media input port of the high definition media display device, is disclosed.

According to another preferred embodiment of the invention, a method for utilizing multiple microphones for synchronized and position-based audio, comprising the steps of: receiving, at a media computing device comprising a processor, a memory, a plurality of wireless network interfaces, an audio controller configured to transmit audio content via at least a wireless network interface, and an operating system configured to receive audio input streams from a plurality of audio input devices, analyze at least a portion of the received audio input streams, and direct operation of the audio controller based at least in part on the analysis, a plurality of audio input streams; analyzing at least a portion of the received audio input streams; producing a position model based at least in part on at least a portion of the analysis results; and directing the operation of the audio controller based at least in part on the position model, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
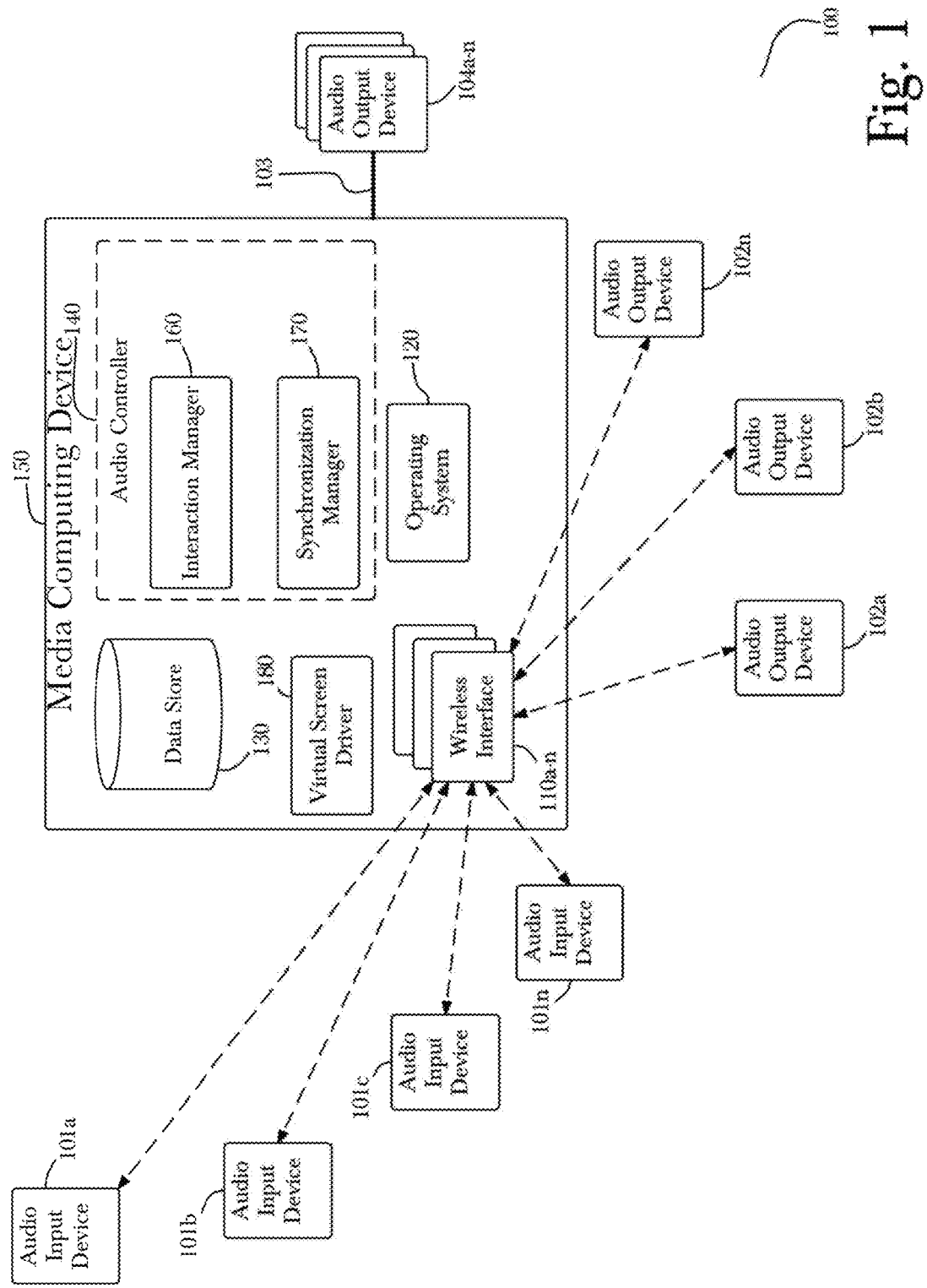
FIG. 1 is a block diagram of an exemplary architecture for using multiple audio input devices for synchronized and position-based audio that uses a media computing device, according to a preferred embodiment of the invention.

The inventor has conceived, and reduced to practice, in a preferred embodiment of the invention, a system and method for using multiple audio input devices for synchronized and position-based audio.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for operating multiple microphones for synchronized voice interaction that uses a media computing device, according to a preferred embodiment of the invention. According to the embodiment, a media computing device 150 may comprise a data store 130, a plurality of wireless network interfaces 110*a-n*, and an audio controller 140. The audio controller 140 may further comprise an interaction manager 160, a synchronization manager 170, a memory 11, a processor 12 (as described below, referring to FIG. 6), configured to operate without integral hardware display or input devices (such as, for example, a computer monitor or keyboards as are commonly present in computing devices), and configured to operate a software operating system 120, for example including (but not limited to) ANDROID™, APPLE IOS™, WINDOWS™, and various forms of LINUX™ and communicate with, manage, and control actions taken by the interaction manager 160 and synchronization manager 170. Operating system 120 may generally have a "home screen" or similar primary environment that may be used by a user to interact with various hardware or software features and functions of the media computing device 150. Alternatively, OS 120 may provide a plurality of logical desktops or other virtual screens to users via mobile devices 101*a-n*. To facilitate user interaction, a virtual screen driver 180 may listen for connections via a network or physical connection from a plurality of mobile devices 101*a-n* (such as, for example including but not limited to, a tablet computing device or smartphone), and may present a virtual screen to a device after connecting. A user may then interact with his mobile device normally using whatever means are available according to the particular configuration of the mobile device, and this interaction may be provided to virtual screen driver 180 for translation and delivery to OS 120. This allows users to perform actions such as installing programs, adjusting settings, such as any of audio controller 140 sub-component settings, modifying media playback configurations, selecting or configuring audio output device 102*a-n*/104*a-n*, or performing administrative tasks. Wireless network interface 110*a-n* may use a variety of different technologies or protocols, such as using various frequency bands or channels for Wi-Fi connectivity, BLUETOOTH™, cellular radios, or other network connection types, individually, a mixture of, or collectively, to connect audio input devices 101*a-n* and audio output devices 102*a-n* to the media computing device 150. The media computing device 150 may connect, through a plurality of wireless network interfaces 110*a-n*, to receive audio interactions from a plurality of audio input devices 101*a-n* such as microphones, or audio input files (for example, to use computer shortcuts to voice commands by playing pre-recorded audio clips or generated audio such as from a text-to-speech software application), or mobile devices such as mobile phones, smartphones, tablets, or laptop computers with either integrated microphones or externally connected microphones, any of which may be used in a capacity for capturing audio. Further, the media computing device 150 may provide audio-based feedback or responses for playback through a plurality of audio output devices 102*a-n*, connected through a plurality of wireless network interfaces 110*a-n*, or to a hard-wired audio output device 104*a-n*, connected by at least one physical connection 103 such as an audio cable suited to supply sound to hard-wired audio output device 104*a-n*, which may be analog cables for analog devices or digital cables for digital devices, connected such as to provide an audible confirmation of an interaction, play music, provide sound or speech information in response to an interaction request (as may be desired when interacting with a virtual assistant software application, for example), or any other such arrangement utilizing audio output. The audio controller 140 comprising at least an interaction manager 160 and synchronization manager 170, components of which may include those as referred in FIG. 2, may be configured to receive raw audio input via a plurality of wireless interfaces 110*a-n* from a plurality of audio input devices 101*a-n*, from a plurality of locations and distances from the wireless interfaces 110*a-n*, each according to its operating range, meaning, range of audio input devices 101*a-n* may vary and are not required to be set up on a grid or anticipated array, but may be located anywhere within operating range of a selected network, be it Wi-Fi connectivity, BLUETOOTH™, cellular radios, or other network connection types, each having associated operating ranges known to those skilled in the art. The audio interactive computing device 150 may receive raw audio from audio input devices 101*a-n*, encode, package and decode it using the audio controller 140, store it, if necessary, in data store 130, and transmit it to audio output devices 102*a-n*/104*a-n*.

According to various alternative arrangements, virtual screen driver 180 may connect via physical connections 103 such as a USB cable (or other cable connections), for example to connect to a mobile device 104*a-n* with particular hardware capabilities, such as a personal computing device that may have a USB port but no active network connection. Wireless network interface 110*a-n* may use a variety of different technologies or protocols, such as using various frequency bands or channels for Wi-Fi connectivity, BLUETOOTH™, cellular radios, or other network connection types, to connect audio input devices 101a-n and audio output devices 102a-n/104a-n to media computing device 150.

It should be appreciated that audio input devices 101a-n and output devices 102a-n may be operating on a single hardware device or may be integrally or removably affixed together as a single unit, according to a particular arrangement or use case. For example, many hardware microphone and speaker devices common in the art utilize similar physical construction and signal processing, and may be used interchangeably as input or output devices as needed. In this manner, a single hardware device may serve as both an audio input and output, simplifying physical architecture and reducing cost while improving user experience by providing audio feedback from the exact location where audio input was received or "heard". This may be utilized to give a user the impression of natural speech with another individual, by providing audio responses and hearing input from a "listener's point of view".

Figure 2:
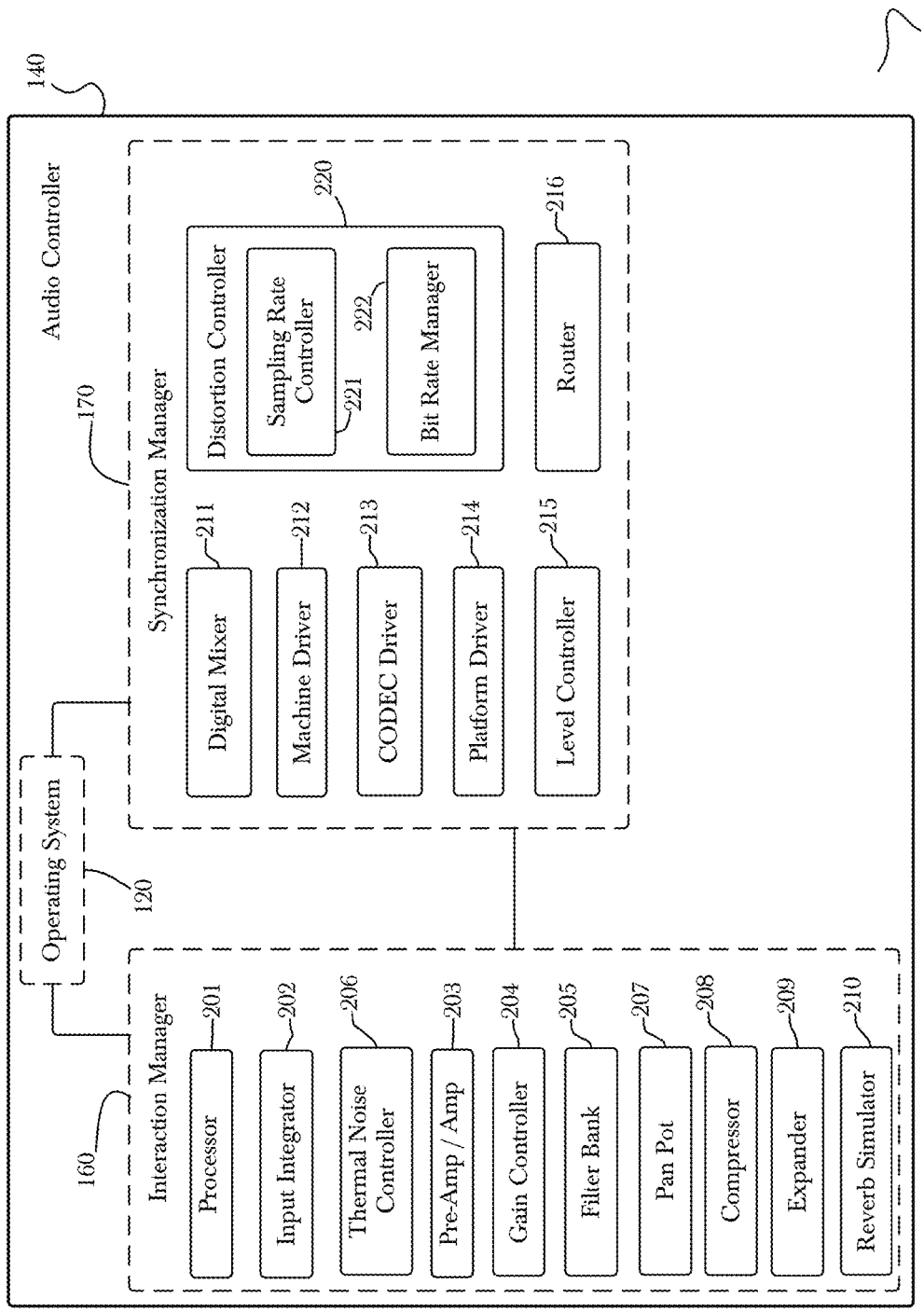
FIG. 2 is a block diagram of an exemplary architecture for an audio controller that may include an operating system, a synchronization manager, and an interaction manager within the media computing device, according to a preferred embodiment of the invention.

FIG. 2 is a block diagram of an exemplary architecture 200 for an audio controller 140 that may include an operating system 120, a synchronization manager 170, and an interaction manager 160, according to a preferred embodiment of the invention. The synchronization manager 170 may comprise a plurality of sub-components which may be used to receive, synchronize and transmit audio streams to the interaction manager 160 and any of its sub-components. The synchronization manager 170 may comprise a digital mixer 211 which may be used to collect and combine multitrack recording or signals together from a plurality of inputs, and mixed by a dedicated summing mixer or by an algorithm, and in communication with the interaction manager 160, may engage to set levels on a level controller 215, equalization on a processor 201, using stereo panning, or other effects controlled by the interaction manager 160; a machine driver 212 may be used to join a CODEC driver 213 and a platform driver 214, the CODEC driver may comprise generic and hardware independent code, configured to provide audio capture or playback, devoid of target platform or machine specific code; the platform driver 214 may be configured to configure and control the audio controller 140; a level controller 215 which may be configured to adjust incoming or outgoing levels, as may be required for mixing, processing and transmitting; a router 216 which may route source signals to internal components, such as processor 201, or audio output devices 102a-n/104a-n, or intermediary controllers, such as HDMI controller 301 (refer to FIG. 3, below); and a distortion controller 220 which may be used to control and align sampling rates with a sampling rate controller 221 or bit rates with a bit rate manager 222 in cases where input signals are not aligned, or where signals need to be mixed and processed at one bit rate and transmitted for playback at a different bit rate. For example, audio may be recorded at an 8-, 16-, or 24-bit depth which yield a theoretical maximum signal-to-quantization-noise ratio for a pure sine wave of, approximately, 49.93 dB, 98.09 dB and 122.17 dB, while compact disk quality audio typically uses 16-bit samples, considering that thermal noise limits the true number of bits that may be used in quantization. Speech signals, meaning, those intended to carry only human speech, may usually be sampled at much lower rates, typically in a range of 5-4,000 Hz, thus an 8-bit sampling rate is sufficient whereas digital signal processing may have very high dynamic range, consequently it is common to perform mixing and mastering operations at 32-bit precision and then convert to 16 or 24 bit for distribution. The interaction manager 160 may comprise a processor 201 for processing audio signals and streams, and engaging any necessary sub-components within the interaction manager 160 such as an input integrator 202 which may be used with a pre-amplifier 203 or an amplifier 203 and synchronization manager 170 to perform mathematical operation of integration with respect to time, in aspects handling analog signals, such as, for example, analog-to-digital conversion; a pre-amplifier or amplifier 203 which may be used to amplify low-power electronic audio signals composed primarily of low level frequencies, such as, for example, those between 20-20 000 Hz (human range of hearing), to a level that is strong enough for driving audio output devices 102a-n/104a-n and rendering audio playback audible to listeners; a gain controller 204 which may be used to manage relative levels in a series of gain stages to prevent introduction of noise or distortion; a filter bank 205 which may be used as a limiter, to act on signals above a certain threshold; a thermal noise controller 206 which may be used to manage and control effects of thermal noise; a pan pot 207 which may be configured to place sound among dedicated channels, as well as pan signals between these channels; a compressor 208 which may be configured to automatically vary volume ranges of tracks being mixed, such that one signal or track is not drowned out by another when a low volume level on a primary track coincides with a high volume level on a separate signal; an expander 209 which may be used to work opposite of a compressor 208, and may increase a volume range of a source; and/or a reverb simulator 210 which may be used to simulate boundary signal reflections created in an enclosed space, or to group and categorize reverberant characters in auditory streaming. Sub-components of the interaction manager 160 and the synchronization manager 170 may not all be included and required in a particular embodiment, depending on form and function intended, but are listed for exemplary purposes, to illustrate a series of primary roles that may be assigned within the audio controller 140.

Referring back to FIG. 1, considering possible sub-components of audio controller 140 as described in FIG. 2, the synchronization manager 170, may receive multiple interactions or audio output from interaction manager 160 or from a plurality of audio input devices 101a-n, and may utilize various methods to enforce synchronization between multiple audio channels or streams. For example, using processor clock-based timing methods, audio channels may be mixed by synchronization manager 170 into a single audio stream for use in monaural processing by interaction manager 160 according to a particular use case, or a particular audio channel may be identified and processed individually within the interaction manager 160 while maintaining synchronicity with other audio channels by use of the synchronization manager 170. It should be appreciated that synchronicity may not necessarily be time-based and may utilize a variety of synchronization metrics such as network speeds or packet travel times, specific audio frequency or amplitude, physical location of an audio input device 101a-n or a calculated position of a source providing input through an audio input device 101a-n, or any other such means of grouping and synchronizing audio channels. According to a particular arrangement, audio channels or synchronized audio streams may be provided to external devices or services, such as third-party or cloud-based services communicating via a network, for example cloud-based automation services such as IFTTT™, HOOKS™, Amazon ECHO™, Google NOW™, Apple SIRI™, or other such products or services that may utilize audio or voice-based interaction or feedback.

Figure 3:
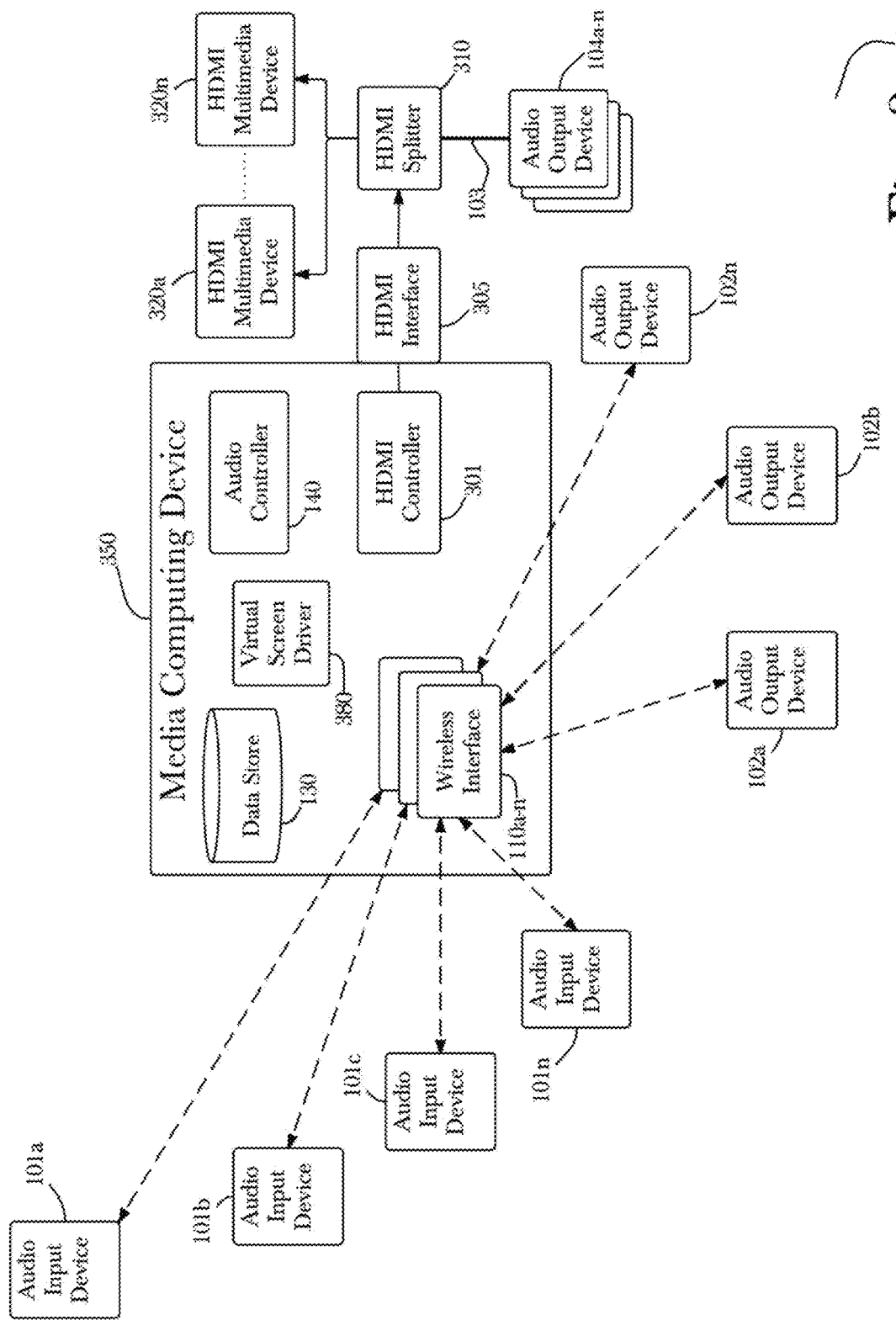
FIG. 3 is a block diagram of an alternate exemplary system architecture for using multiple audio input devices for synchronized and position-based audio that uses a media computing device with multiple virtual screens, according to a preferred embodiment of the invention.

FIG. 3 is a block diagram of an alternate exemplary system architecture 300 for operating multiple microphones for synchronized voice interaction that uses a media computing device with multiple virtual screens, according to a preferred embodiment of the invention. According to the embodiment, an HDMI media computing device 350 may comprise a data store 130, a plurality of wireless network interfaces 110a-n, an audio controller 140, a virtual screen driver 380 and an HDMI controller 301 with access to a HDMI interface 305 (the device of the invention typically being inserted into an HDMI port of an audio output device such as an HDMI multimedia device 320a-n and may be connected singularly or split by an appropriate HDMI splitter 310, and controlling the HDMI multimedia device 320a-n or the audio output device 104a-n using HDMI interface 305). As referenced in FIG. 2, the audio controller 140 may further comprise an interaction manager 160, a synchronization manager 170, a memory 11, a processor 12 (as described below, referring to FIG. 6), configured to operate without integral hardware display or input devices (such as, for example, a computer monitor or keyboards as are commonly present in computing devices), and configured to operate a software operating system 120, for example including (but not limited to) ANDROID™, APPLE IOS™, WINDOWS™, and various forms of LINUX™ and communicate with, manage, and control actions taken by the interaction manager 160 and synchronization manager 170. Wireless network interface 110a-n may use a variety of different technologies or protocols, such as using various frequency bands or channels for Wi-Fi connectivity, BLUETOOTH™, cellular radios, or other network connection types, individually, a mixture of, or collectively, to connect audio input devices 101a-n and audio output devices 102a-n to the HDMI media computing device 350. The HDMI media computing device 350 may connect, through a plurality of wireless network interfaces 110a-n, to receive audio interactions from a plurality of audio input devices 101a-n such as microphones, or audio input files (for example, to use computer shortcuts to voice commands by playing pre-recorded audio clips or generated audio such as from a text-to-speech software application), or mobile devices such as mobile phones, smartphones, tablets, or laptop computers with either integrated microphones or externally connected microphones, any of which may be used in a capacity for capturing audio. Further, the HDMI media computing device 350 may provide audio-based feedback or responses for playback through a plurality of audio output devices 102a-n, connected through a plurality of wireless network interfaces 110a-n, or to a hard-wired audio output device 104a-n, connected by a HDMI interface 305 plugged into an HDMI splitter 310, connected by a physical connection 103 such as an audio cable suited to supply sound to hard-wired audio output device 104a-n, which may be analog cables for analog devices or digital cables for digital devices, connected such as to provide an audible confirmation of an interaction, play music, provide sound or speech information in response to an interaction request (as may be desired when interacting with a virtual assistant software application, for example), or any other such arrangement utilizing audio output. The audio controller 140 comprising at least an interaction manager 160 and synchronization manager 170, components of which may include those as referred in FIG. 2, may be configured to receive raw audio input via a plurality of wireless interfaces 110a-n from a plurality of audio input devices 101a-n, from a plurality of locations and distances from the wireless interfaces 110a-n, each according to its operating range, meaning, range of audio input devices 101a-n may vary and are not required to be set up on a grid or anticipated array, but may be located anywhere within operating range of a selected network, be it Wi-Fi connectivity, BLUETOOTH™, cellular radios, or other network connection types, each having associated operating ranges known to those skilled in the art. The HDMI media computing device 350 may receive raw audio from audio input devices 101a-n, encode, package and decode it using the audio controller 140, store it, if necessary, in data store 130, and transmit it to audio output devices 102a-n/104a-n or via the HDMI interface 305 plugged connected to an HDMI multimedia device 320a-n, either directly or through HDMI splitter 310 which may direct audio to a plurality of connected devices, not limited to only HDMI connections.

According to the embodiments described above, audio output devices 102a-n/104a-n may be any form of software or hardware device adapted to receive and utilize audio signals, such as a hardware speaker or headphones. Output devices 102a-n/104a-n may also comprise a variety of network-based output, such as for playing audio via a telephony communication network for use by an interactive voice response (IVR) system or recording by a voicemail service, or for interaction with users via a communication network. In this manner it can be appreciated that interaction with a system 100 or system 300 according to the respective embodiments, need not require all user devices (or, in fact, any user devices) to be physically located near any components of system 100/300, and all interaction may be possible via network communication according to a particular arrangement. For example, multiple users may be communicating in a group environment such as a conference call, and a "virtual participant" in the conference may be a plurality of audio input and output communication channels operating according to the system 100/300 of the embodiment. In such an arrangement, participants in the conference call may naturally interact with a virtual assistant, search engine, or deep-learning software such as WOLFRAM ALPHA™, by communicating naturally during the call while system 100/300 "listens" and responds to all participants. In this manner it can be appreciated that by utilizing the multiple microphone and audio synchronization capabilities of the invention, a variety of speech-interaction technologies may be enhanced with the capacity for more natural interaction as well as the option to be adapted for interaction with any arbitrary number of users simultaneously for natural group-based interaction.

Audio synchronization may be utilized according to a particular use case or arrangement for various purposes, such as to combine individual audio channels into a single audio stream for ease of processing, such as for use by virtual assistant software applications (such as Apple SIRI™, for example) that may be adapted to accommodate interaction with a single individual and may be confused or slowed by multiple input audio channels. Such an arrangement of system 100/300 may be utilized to enhance single-user operation, by providing a user with the illusion of "speaking to the whole room" wherein they may speak naturally from any location and their interaction is processed and responded to similarly through the use of multiple synchronized audio devices, rather than "speaking toward a device", such as when a user instinctively turns to speak in the general direction of a device they know is receiving their input. This may improve user interaction and adoption of speech-based interaction technologies, by encouraging natural interaction and removing a common source of inconvenience or "learning curve" generally associated with such forms of interaction.

In another synchronization example, multiple audio channels may be preserved while synchronization is enforced, such as to expand a virtual assistant to interact with multiple users in a confined space such as a room in a home or an office. For example, if two individuals wish to speak to a virtual assistant, their respective audio input may be preserved and associated with their individual locations (such as, "audio A came from microphone X", for example), while being synchronized with one another so they may be processed in the order in which they were received. A virtual assistant may then provide audio responses to each speaker according to their individual interactions, by providing output through an output device nearest each individual (again, "audio A plays through speaker X", for example), maintaining individual interactions for each user while operating a single virtual assistant. Such functionality may be further enhanced by allowing "shared interaction", wherein an individual may participate in an interaction involving another individual, such as by asking a follow-up question after a first individual receives an audio response. This operation may greatly enhance the ease of interaction and overall user experience for virtual assistants and other voice-interactive technologies, and it should be appreciated that such functionality may be provided to a wide variety of third-party products or services according to various arrangements.

In a further synchronization example, audio synchronization may be utilized according to a particular use case or arrangement for various purposes, such as to combine individual audio channels into a single audio stream as may be desired for users in a singing or karaoke setting. Such an arrangement of system 100/300 may be utilized to enable two or more users to engage in a sing-along or karaoke event, from the comfort of their own seat or anywhere they may be within the operating range of the operating network, and may connect through their smartphone, using the integrated microphone(s) or externally connected microphones, such as headsets, either wired or wireless, to view lyrics or simply sing along with a familiar song or tune. In this way, groups of individual users may engage in singing without a need for a stage or formal venue. For example, in an eatery or restaurant where music and games may be played, use of system 100 or system 300 may allow for individual tables or booths to engage in singing along, with playback being heard through connected devices, which may include smartphones being used as input devices as well as hard-lined speakers or sound systems within the eating establishment. This way, no stage is needed in the area and no pressure is set upon a user, who may typically be discouraged to engage due to fear of being seen or 'stage-fright'.

According to the embodiment, a media computing device 350 may comprise a memory 11 and a processor 12 (as described below, referring to FIG. 6), configured to operate without integral hardware display or input devices (such as, for example, a computer monitor or keyboard as are commonly present in computing devices), and configured to operate a software operating system 120, for example including (but not limited to) ANDROID™, APPLE IOS™, WINDOWS™, and various forms of LINUX™. OS 120 may operate an audio controller 140 that provides media content for viewing via an HDMI display device 320a-n connected via HDMI interface 305 and controlled by HDMI controller 301, such as a television or computer monitor, and a virtual screen driver 380 that may operate a plurality of virtual (logical) interactive software interfaces ("virtual screens") and may present at least a portion of these screens for interaction via a plurality of mobile devices 101a-n communicating via a plurality of wireless network interfaces 110a-n. Operating system 120 may generally have a "home screen" or similar primary environment that may be used by a user to interact with various hardware or software features and functions of the media computing device 350. Alternatively, OS 120 may provide a plurality of logical desktops or other virtual screens to users via mobile devices 101a-n. To facilitate user interaction, virtual screen driver 380 may listen for connections via a network or physical connection from a plurality of mobile devices 101a-n (such as, for example including but not limited to, a tablet computing device or smartphone), and may present a virtual screen to a device after connecting. A user may then interact with his mobile device normally using whatever means are available according to the particular configuration of the mobile device, and this interaction may be provided to virtual screen driver 380 for translation and delivery to OS 120. In this manner, media may be presented on an external display device 320a-n such as a high-definition television (the device of the invention typically being inserted into an HDMI port of the television, and controlling the television using HDMI interface 305), while users interact with an operating system via virtual screen driver 380, allowing users to interact with software applications. This allows users to perform actions such as installing programs, playing games, modifying media playback configurations, selecting media for presenting to external display device 320a-n, or performing administrative tasks.

It should be noted that, while HDMI is used in the example of FIG. 3 and is discussed throughout, other similar media interfaces may be used in place of HDMI, according to the invention. For example, DISPLAYPORT™ interfaces may be used; in such embodiments, HDMI controller 301 and HDMI interface 305 would be instead a DISPLAYPORT™ controller 301 and a DISPLAYPORT™ interface 305; similarly, other newly emerging high-definition media interfaces may be used in various embodiments of the invention.

According to various alternative arrangements, virtual screen driver 380 may connect via physical connections such as a USB cable (or other cable connections), for example to connect to a mobile device 101a-n with particular hardware capabilities, such as a personal computing device that may have a USB port but no active network connection. Wireless network interface 110a-n may use a variety of different technologies or protocols, such as using various frequency bands or channels for WiFi connectivity, BLUETOOTH™, cellular radios, or other network connection types, to connect mobile devices 101a-n to media computing device 350.

Virtual screen driver 380 may operate multiple connections for multiple mobile devices 101a-n, for example so that more than one user may interact with the operating system of media computing device 350. According to various arrangements, each mobile device 101a-n may be presented a separate "instance", or copy, of an operating system home screen or other virtual screen, so that each user may have access to the operating system for interaction without being affected by the activities of other users that may be connected. In some arrangements, user access may be restricted such as to provide read-only access to some portions of an operating system, or to restrict software applications or functions based on configured criteria such as mobile device or connection type, or using stored software-based whitelisting or blacklisting behavior. In other arrangements, multiple mobile devices 101a-n may be presented with the same instance of a home screen, so that multiple users may interact collaboratively such as to work together while editing stored files, or to interact with a shared screen in a gaming application, or other shared-use cases. When multiple users are connected to a single virtual screen driver 380, congestion may be managed by operating a "safe mode" or minimal interface for new users, such as when system resources are limited or after a set number of concurrent users has been reached (for example, providing a full interface to the first four users and a stripped-down interface to any users after that). For example, a new user connecting may be presented with a notification that the maximum number of connections has been reached, or that resources are limited, and be prompted to abort or continue with limited functionality. A limited interface may comprise, for example, basic remote control functionality to direct the operation of audio controller 140 remotely, for example features such as "next track", "play/pause", or volume controls. In this manner, additional users may still be able to control media being viewed on display device 320a-n, without requiring full OS interaction.

DETAILED DESCRIPTION OF EXEMPLARY EMBODIMENTS

Figure 4:
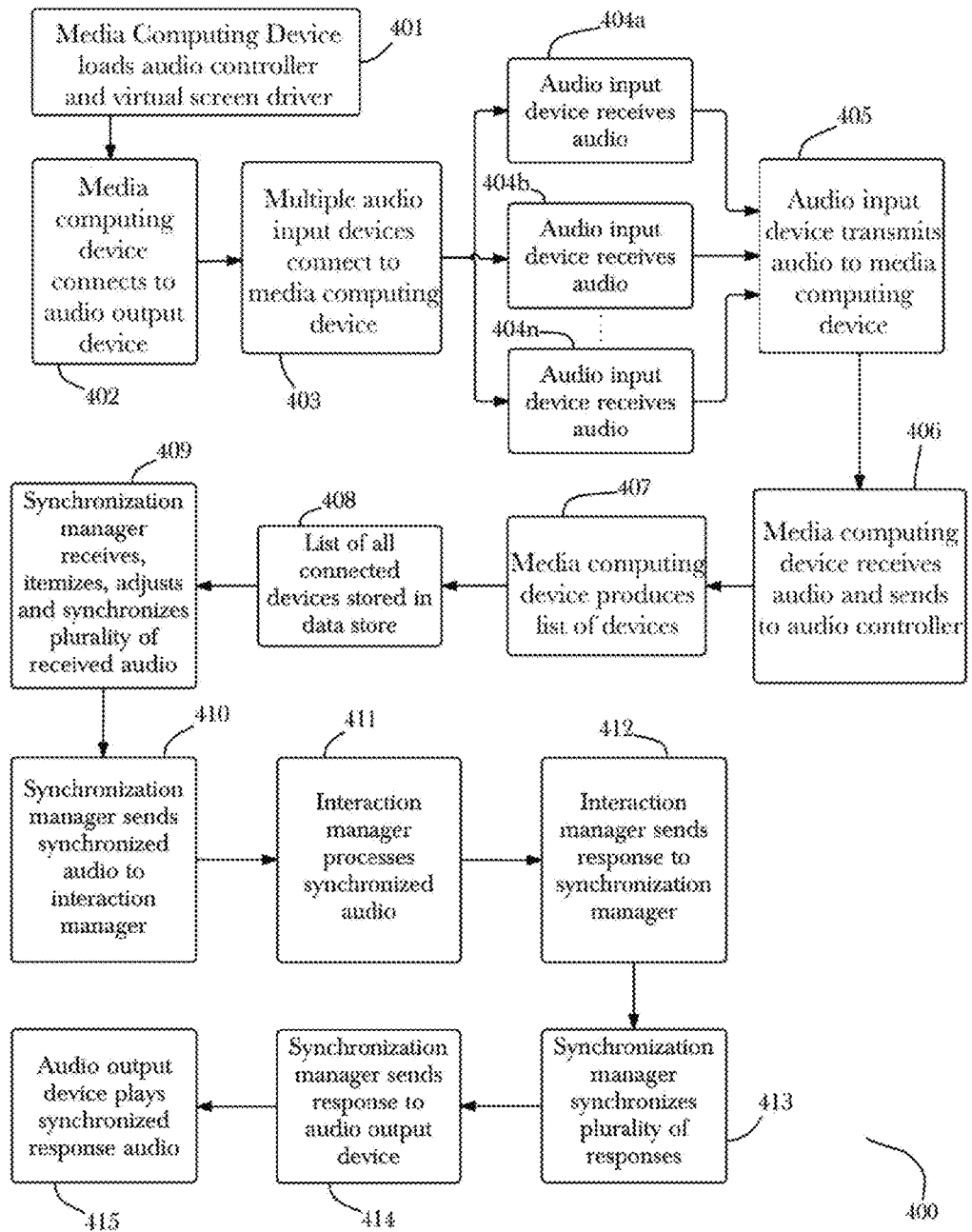
FIG. 4 is a method flow diagram illustrating an exemplary method for using multiple audio input devices for synchronized and position-based audio, according to a preferred embodiment of the invention.

FIG. 4 is a flow diagram illustrating an exemplary method 400 for operating multiple microphones for synchronized voice interaction, according to a preferred embodiment of the invention. In an initial step 401, the media computing device 150 may load an audio controller 140 containing a software operating system 120 from a memory 11, and may begin operating audio controller 140 and virtual screen driver 180. In a next step 402, the media computing device 150 may connect to at least one audio output device 102a-n/104a-n, and in a next step 403, a plurality of audio input devices 101a-n may connect to media computing device 150. In a string of parallel next steps 404a-n, audio may be received by an audio input device 101a-n such as a microphone or a sound processor operated by an electronic device. In a next step 405 audio input devices 101a-n transmit individual audio streams to media computing device 150, which in a next step 406 listens and receives audio streams into audio controller 140. In a next step 407, media computing device 150 records and produces a list of connected audio devices 101a-n/102a-n/104a-n and in a next step 408, stores this list of devices in data store 130. In a next step 409, a synchronization manager 170, a component of the audio controller 140, may receive, itemize and synchronize a plurality of received audio interactions with other received audio interactions, according to a particular use (such as for noise cancellation, echo reduction, combining multiple audio channels into a monaural audio stream, or operating separate audio interactions while maintaining their relative synchronicity. In a next step 410, the synchronization manager 170 may provide synchronized interactions to an interaction manager 160, and in a next step 411 the interaction manager may process the synchronized audio interactions for use (such as for submission as search queries, dictation input, or providing to speech-enabled software applications such as virtual assistants). In a next step 412 the interaction manager 160 may generate audio feedback, provide the feedback, and send response to the synchronization manager 170 for synchronization (such as to play multiple audio responses simultaneously for a multi-user interaction use as described above, with reference to FIG. 1 or FIG. 3). The synchronization manager 170 may then, in a next step 413, synchronize the plurality of responses such that the synchronization manager 170 may, in a next step 414, send an audio response to an output device, for example to play varied audio through multiple output devices for a "surround" audio effect, or to deliver a particular response to a specific user by sending it to a device located nearby, and in a final step 415 the synchronized audio feedback may be played through an audio output device such as a speaker, headphones, or communication network such as a telephone or voice over internet protocol (VoIP) connection. Referring to exemplary embodiments of the invention, as referenced in FIG. 1 and FIG. 3, it should be understood that exemplary method 400 for operating multiple microphones for synchronized voice interaction may be applied to system 300 as it has been for system 100, with HDMI media computing device 350 being supplemented for media computing device 150 in above steps.

Figure 5:
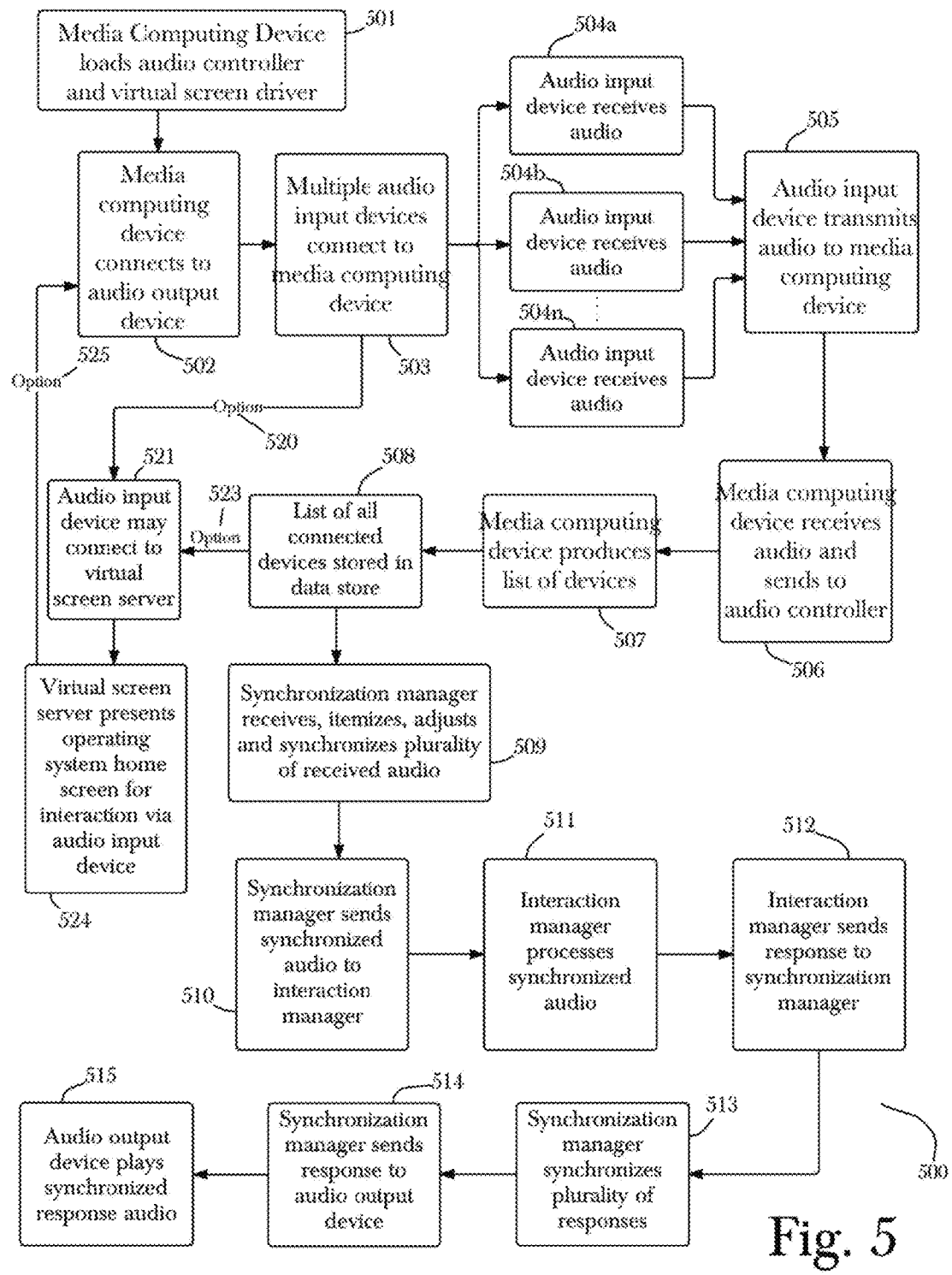
FIG. 5 is an alternate method flow diagram illustrating an exemplary method for operating multiple microphones and interacting with the media computing device for enhanced synchronized voice interaction, according to a preferred embodiment of the invention.

To further demonstrate, the following exemplary method 500 is described with reference to system 300, however, either system 100/300 may be applied to exemplary method 500 as illustrated in FIG. 5. FIG. 5 is a flow diagram illustrating an exemplary method 500 for operating multiple microphones for synchronized voice interaction with remote screen sharing and access, according to a preferred embodiment of the invention. In an initial step 501, an HDMI media computing device 350 may load an audio controller 140 containing a software operating system 120 from a memory 11, and may begin operating audio controller 140 and virtual screen driver 180. In a next step 502, the HDMI media computing device 350 may connect to at least one audio output device 102a-n or through an HDMI interface 305 plugged into an HDMI multimedia device 320a-n or other audio output device 104a-n, and in a next step 503, a plurality of audio input devices 101a-n may connect to HDMI media computing device 350. Once connected, an optional move 520 may be exercised for an audio input device 101a-n to connect 521 to a virtual screen driver 180, which may then, in a next step 524 present an operating system 120 home screen for interaction via connected audio input devices 101a-n, such as, for example, smartphones or tablets or other interactive input devices containing at least one operable microphone, ability to play sound via speakers or headphones, and provide a graphical user interface to support interaction. Audio input devices 101a-n connected to and interacting with virtual screen driver 180 may, in an optional step 525, connect through HDMI media computing device 350 existing audio output devices 102a-n/104a-n/320a-n or introduce new audio output devices to the system 300. Returning to step 503, where optional step 520 may be exercised simultaneously or separately, a string of parallel next steps 504a-n may occur where audio may be received by an audio input device 101a-n such as a microphone or a sound processor operated by an electronic device. In a next step 505 audio input devices 101a-n transmit individual audio streams to HDMI media computing device 350, which in a next step 506 listens and receives audio streams into audio controller 140. In a next step 507, HDMI media computing device 350 records and produces a list of connected audio devices 101a-n/102a-n/104a-n and in a next step 508, stores this list of devices in data store 130. In an optional move 523, a next step 521 may be exercised for an audio input device 101a-n to connect 521 to a virtual screen driver 180, and follow on as described above for steps 521, 524. Otherwise, in a next step 509, a synchronization manager 170, a component of the audio controller 140, may receive, itemize and synchronize a plurality of received audio interactions with other received audio interactions, according to a particular use (such as for noise cancellation, echo reduction, combining multiple audio channels into a monaural audio stream, or operating separate audio interactions while maintaining their relative synchronicity. In a next step 510, the synchronization manager 170 may provide synchronized interactions to an interaction manager 160, and in a next step 511 the interaction manager may process the synchronized audio interactions for use (such as for submission as search queries, dictation input, or providing to speech-enabled software applications such as virtual assistants). In a next step 512 the interaction manager 160 may generate audio feedback, provide the feedback, and send response to the synchronization manager 170 for synchronization (such as to play multiple audio responses simultaneously for a multi-user interaction use as described above, with reference to FIG. 3 or FIG. 1). The synchronization manager 170 may then, in a next step 513, synchronize the plurality of responses such that the synchronization manager 170 may, in a next step 514, send an audio response to an output device, for example to play varied audio through multiple output devices for a "surround" audio effect, or to deliver a particular response to a specific user by sending it to a device located nearby, and in a final step 515 the synchronized audio feedback may be played through an audio output device such as a speaker, headphones, or communication network such as a telephone or voice over internet protocol (VoIP) connection.

Figure 10:
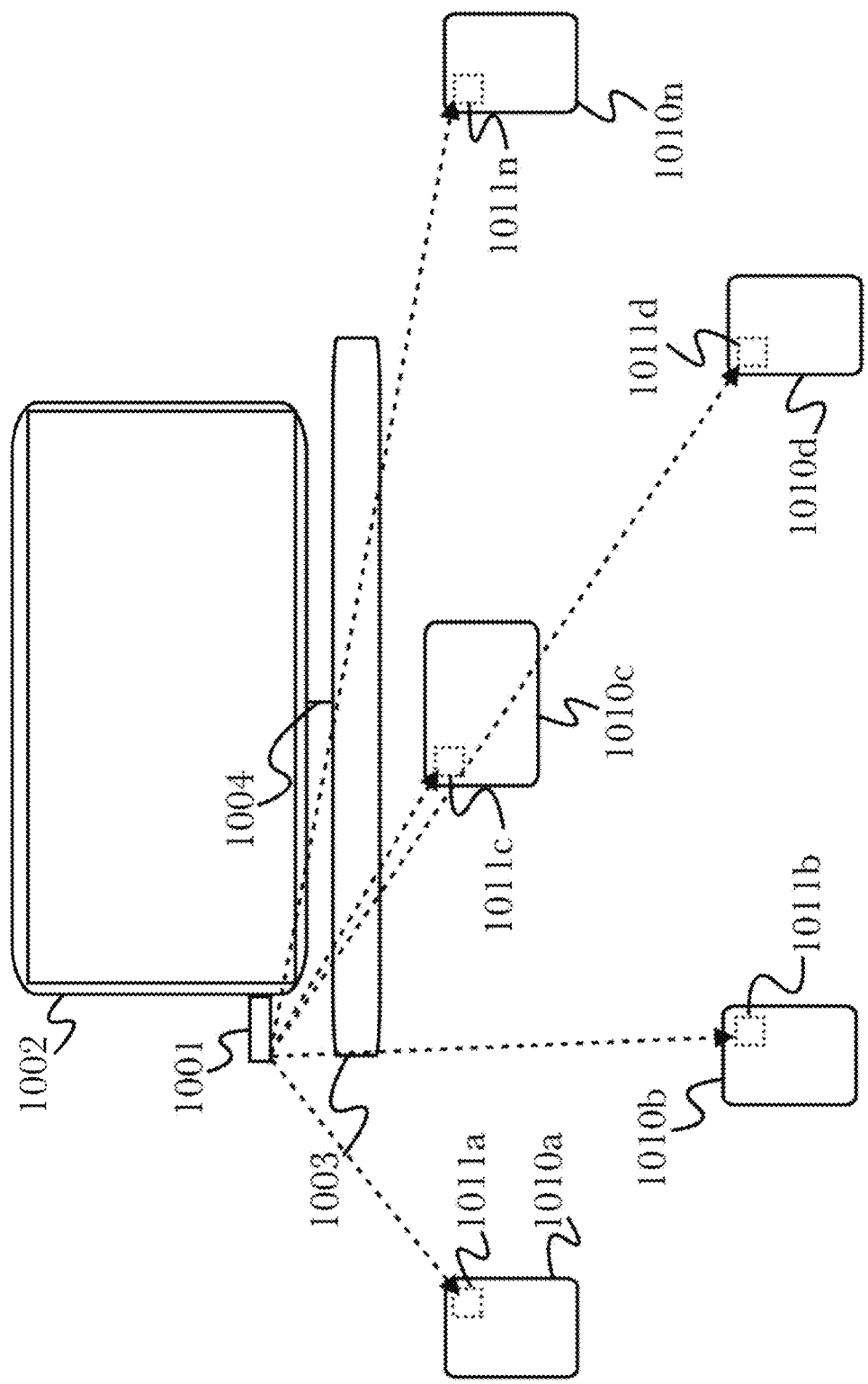
FIG. 10 is an illustration of an exemplary usage arrangement, illustrating the use of a media computing device and multiple mobile devices, each operating a microphone.

FIG. 10 is an illustration of an exemplary usage arrangement, illustrating the use of a media computing device 1001 and multiple mobile devices 1010*a-n*, each operating a microphone 1011*a-n*. According to the embodiment, a plurality of mobile devices 1010*a-n* may each operate a microphone 1011*a-n* and be in communication with a media computing device 1001 connected to various media hardware such as (for example, including but not limited to) a television 1002 or other display device, such as a high-definition multimedia display device (for example, a computer monitor, television, set-top box, personal computer, or other display device with appropriate media input ports), which may in turn be connected to a plurality of additional media hardware such as a speaker sound bar 1003, for example using a direct connection 1004 such as in a home theater or other media viewing arrangement. For example, a media computing device 1001 may be displaying video content via a television 1002 while transmitting audio content via a wired connection 1004 to a sound bar 1003, all while simultaneously connecting to a plurality of mobile devices 1010*a-n* wirelessly via (for example) a structured or ad-hoc network, such as via a WiFi network or using BLUETOOTH™ direct communication.

Mobile devices 1010*a-n* may operate their own microphones 1011*a-n*, as is common in a wide variety of mobile device hardware such as with laptop personal computers, tablet computing devices, or smartphones. While connected to a media computing device 1001, a mobile device 1010*a-n* may listen via its microphone hardware 1011*a-n*, and may transmit some or all of the received audio input to the media computing device 1001 for use. Media computing device 1001 may then utilize this audio input from each connected mobile device 1010*a-n* for various purposes such as (for example) for noise cancellation during group communication or positional audio (described in greater detail below, referring to FIG. 11). For example, if multiple users are in a video conference call, they may use a projector or television 1002 to display another party's video feed during the call, and media computing device 1001 may listen to each user's mobile device to provide their individual audio to the other party while also processing all received audio inputs to filter out any background noise or other interference. This may be done, for example, by listening to a speaker at any given microphone and separating the speaker's voice from any additional audio (for example, based on perceived distance or amplitude), and then optionally comparing against similar processed audio from other connected microphones. This then enables advanced audio filtering using each microphone as an input channel and processing the total received audio to remove noise and interference more effectively while preserving the intended audio content.

Figure 11:
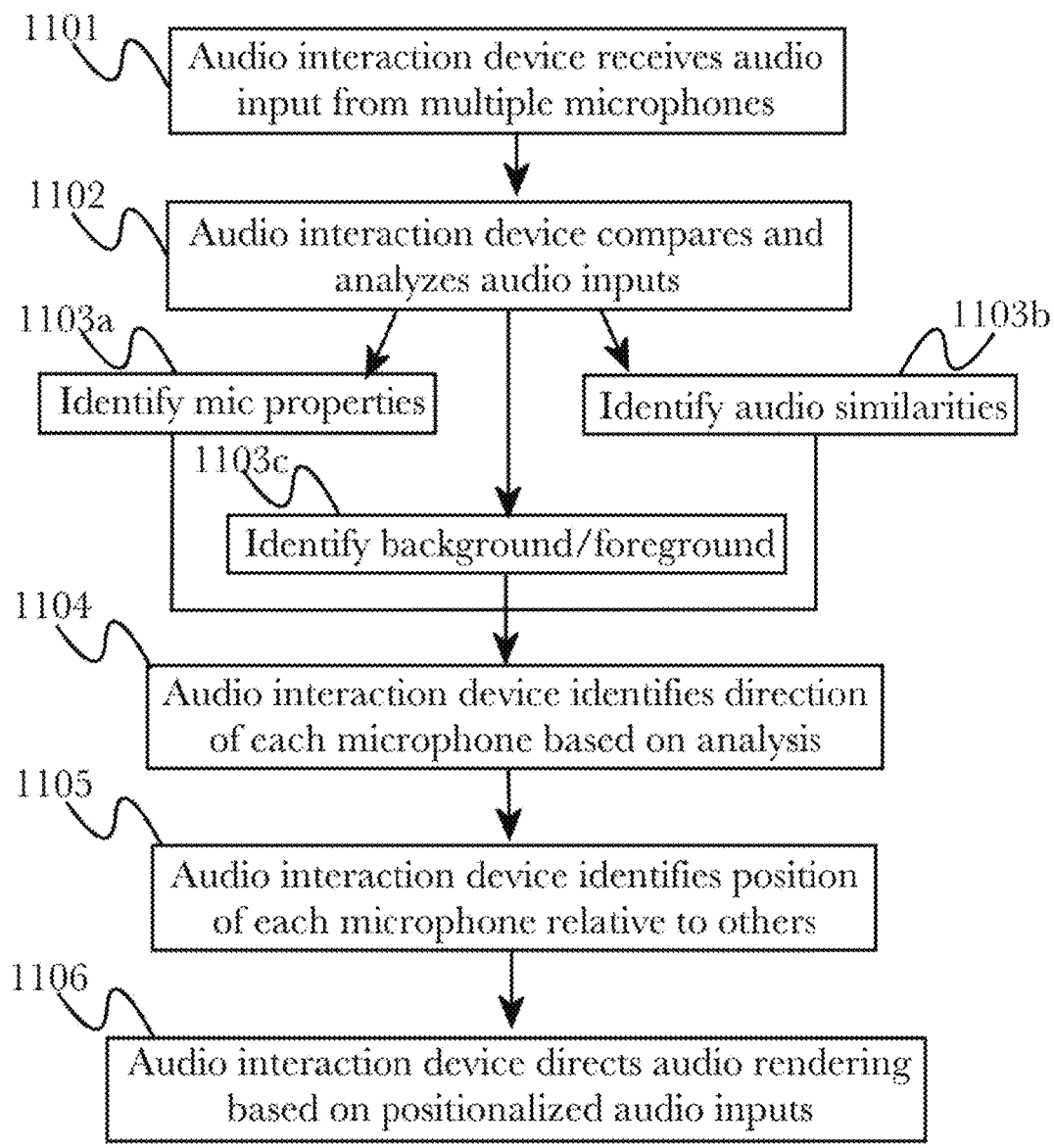
FIG. 11 is a flow diagram illustrating an exemplary method for using multiple audio input devices for synchronized and position-based audio.

FIG. 11 is a flow diagram illustrating an exemplary method 1100 for utilizing multiple microphones for positional audio. According to the embodiment, a media computing device 150 may receive audio input from multiple microphones 1101, for example via direct connections (such as integral microphones in a device with multiple microphones, or a number of microphones connected via wired connections) or over a network such as from devices communicating over a WiFi network. In a next step 1102, media computing device 150 may then compare the received audio inputs against one another and analyze them, for example to identify microphone properties 1103*a* such as hardware capabilities that may affect the audio content received (for example, if a microphone introduces a particular pitch or noise into the recorded audio stream, or if a microphone provides audio content with a particular level or form of compression), identifying the background and foreground audio 1103*b* within a received content stream (for example, to identify a speaker and separate their speech from background noise such as ambient sounds or other people nearby), or to identify similarities between multiple audio streams 1103*c* such as background noise that may be heard in more than one stream (for example, if multiple microphones record a car passing by, it may be recognized as similar audio and then the different pitch, amplitude, or other audio properties may be analyzed) or to identify speech that may be heard by multiple microphones (for example, multiple users speaking nearby may be heard by more than one microphone, and the variance in audio properties such as amplitude, pitch, or timing may then be analyzed). In a next step 1104, the analysis results may be used to identify direction information pertaining to each microphone, such as identifying where each microphone lies relative to the media computing device (for example, by analyzing speech that was heard by multiple microphones, to triangulate the approximate location of each microphone using comparative analysis). In a next step 1105, the media computing device 150 may then identify the position of each microphone relative to other microphones used in the analysis, for example by triangulating each microphone's location based on comparative analysis of the audio streams received to use audio properties such as pitch, amplitude, timing, or variances in foreground or background noise to determine how close each microphone lies to each other microphone, and forming a model of where each microphone lies relative to the others. In a final step 1106, audio rendering may be directed based on the direction and location models, for example to adjust the recording of audio input streams based on analysis of audio properties (for example, to improve clarity by compensating for background noise) or to direct the rendering of audio output streams based on the location models, such as to provide positional audio output to users based on their relative locations. Additionally, this location-based audio direction may be updated continually to accommodate movement of microphones, for example to adjust a particular user's audio input or output properties as they move around by incorporating analysis of audio properties from their microphone and other microphones nearby. For example, as a user moves around the changes in background noise or acoustic properties of their surrounding environment may be predicted using the location model, and their audio may be proactively adjusted as they move to optimize audio recording and rendering.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 6:
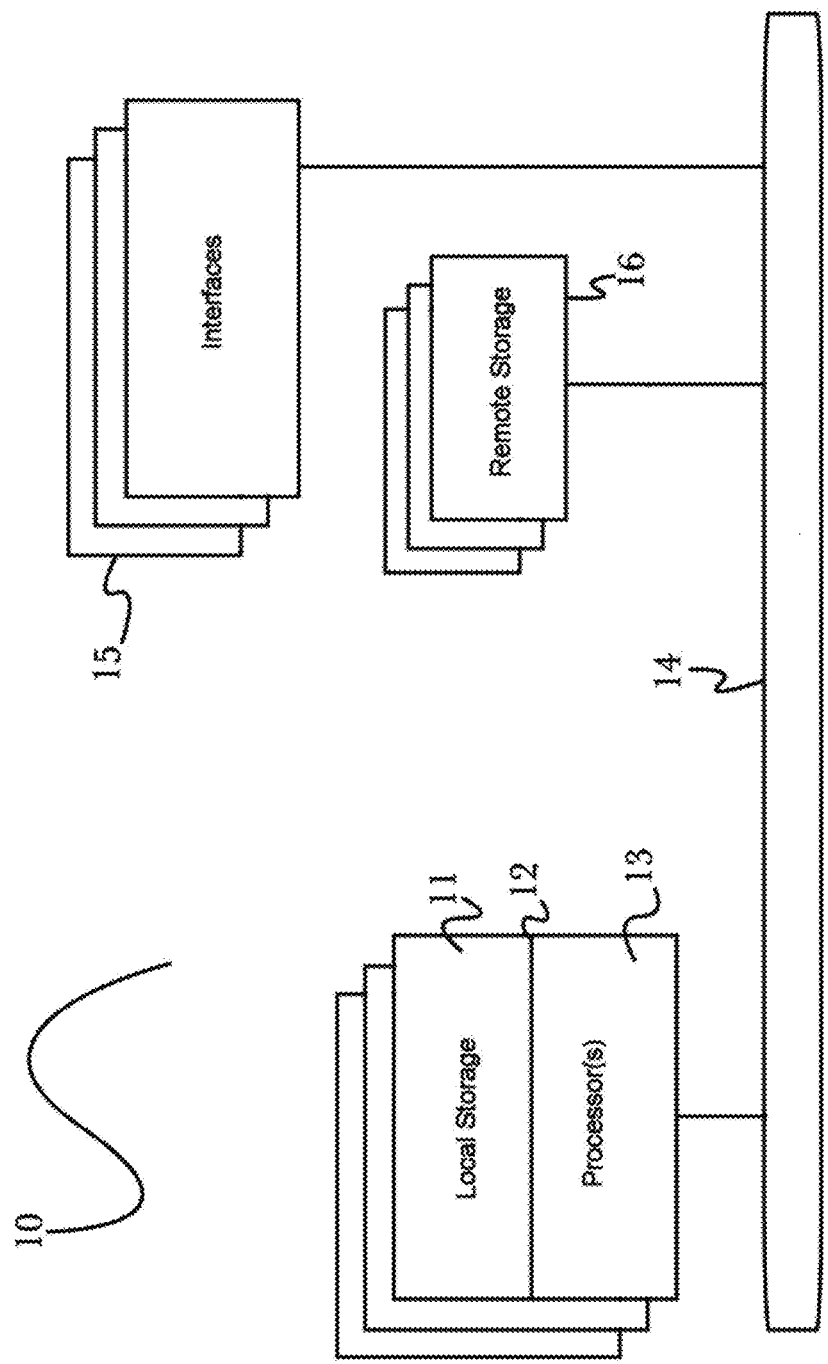
FIG. 6 is a block diagram illustrating an exemplary hardware architecture of a computing device used in an embodiment of the invention.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
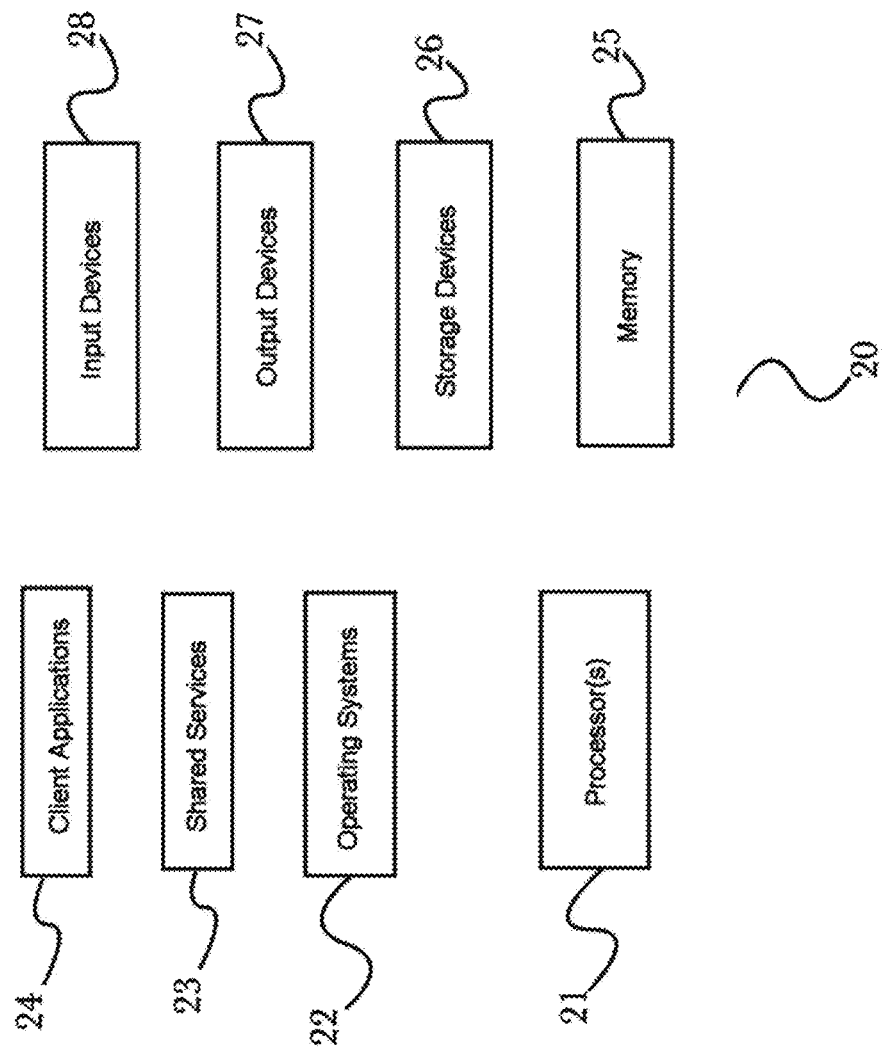
FIG. 7 is a block diagram illustrating an exemplary logical architecture for a client device, according to an embodiment of the invention.

In some embodiments, systems according to the present invention may be implemented on a standalone computing system. Referring now to FIG. 7, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
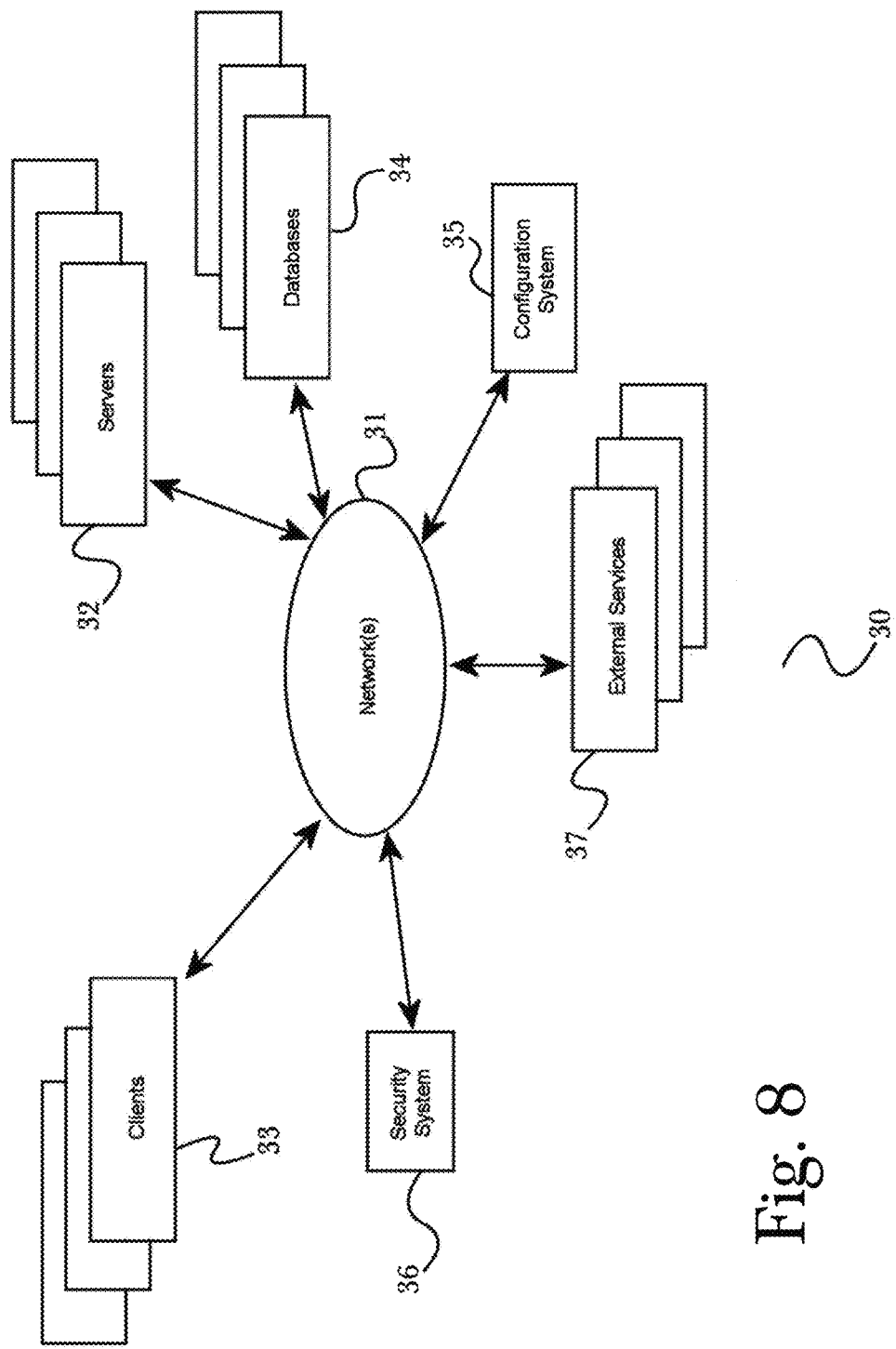
FIG. 8 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 8, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other).

Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 9:
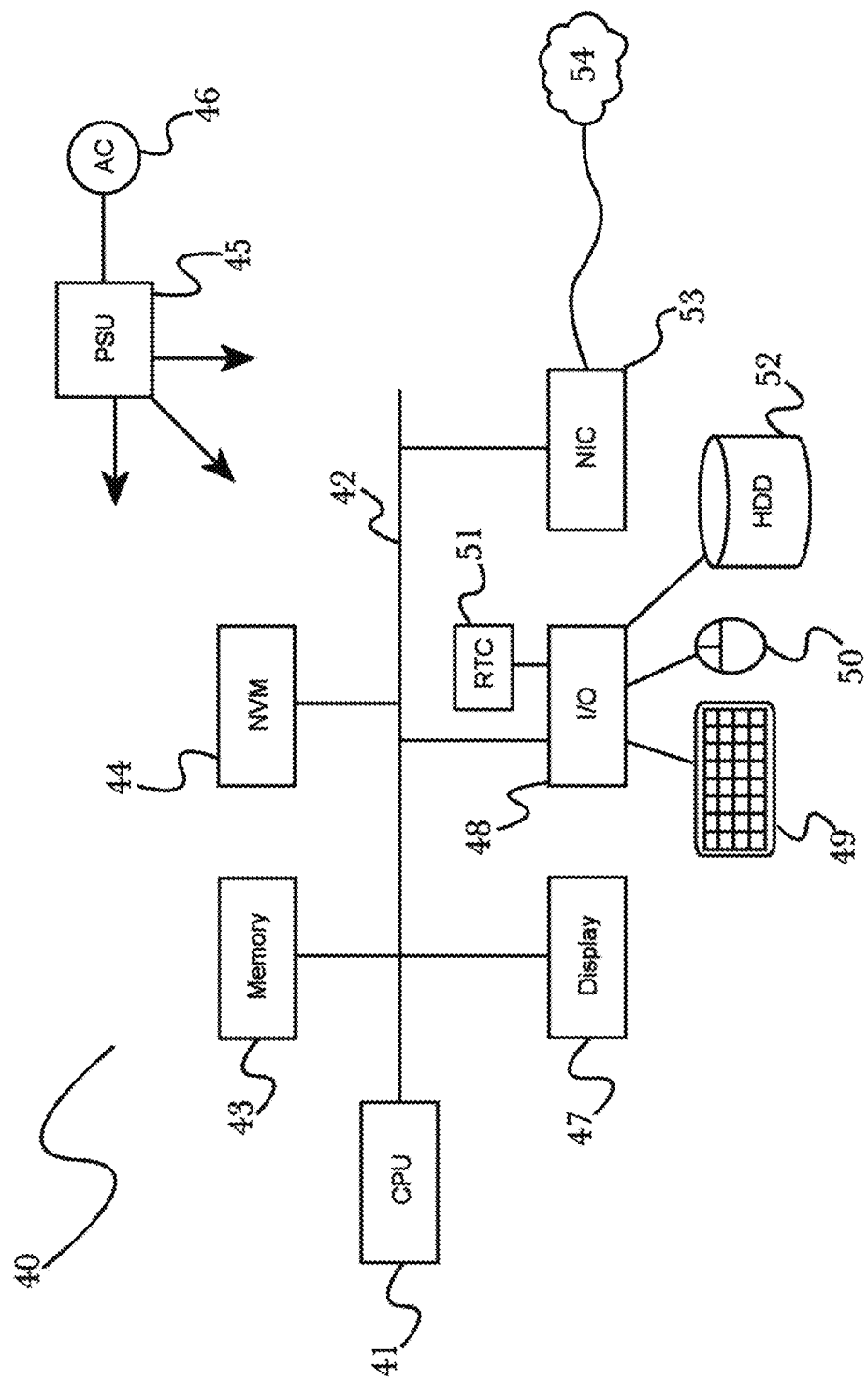
FIG. 9 is another block diagram illustrating an exemplary hardware architecture of a computing device used in various embodiments of the invention.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A media computing device, comprising:
   a processor;
   a memory;
   a plurality of wireless network interfaces;
   an audio controller; and
   an operating system comprising programming instructions stored in the memory and operating on the processor and configured to:
      receive audio input streams from a plurality of audio input devices;
      analyze at least a portion of the received audio input streams;
      produce a position model describing the relative locations of each at least a portion of the plurality of audio input devices, the position model being based at least in part on at least a portion of the analysis; and
      direct operation of the audio controller based at least in part on the position model.

2. The system of claim 1, wherein the analysis comprises at least an analysis of an audio input device's hardware properties.

3. The system of claim 1, wherein the analysis comprises at least a comparison between two or more audio input streams.

4. The system of claim 1, wherein the analysis comprises at least an identification of audio characteristics within an audio input stream.

5. The system of claim 4, wherein the audio characteristics comprise at least background and foreground audio content.

6. The system of claim 1, wherein the audio controller is configured to provide audio content for rendering via at least a wireless network interface.

7. The system of claim 6, wherein the audio content is based at least in part on the position model.

8. A media computing device, comprising:
   a processor;
   a memory;
   a high definition media controller operating a high definition media interface;

a plurality of wireless network interfaces;
an audio controller;
a virtual screen driver; and
an operating system comprising programming instructions stored in the memory and operating on the processor and configured to:
   receive audio input streams from a plurality of audio input devices;
   analyze at least a portion of the received audio input streams;
   direct operation of the audio controller based at least in part on the analysis;
   send screen graphics via the virtual screen driver to a plurality of mobile devices;
   send media content to a high definition media display device via the high definition media controller and the high definition media interface; and
   receive user interaction events from a mobile device via the wireless network interface;
   wherein the high definition media interface is physically coupled by insertion into a high definition media input port of the high definition media display device.

9. The system of claim 8, wherein the analysis comprises at least an analysis of an audio input device's hardware properties.

10. The system of claim 8, wherein the analysis comprises at least a comparison between two or more audio input streams.

11. The system of claim 8, wherein the analysis comprises at least an identification of audio characteristics within an audio input stream.

12. The system of claim 11, wherein the audio characteristics comprise at least background and foreground audio content.

13. The system of claim 8, wherein the audio controller is configured to provide audio content for rendering via at least a wireless network interface.

14. The system of claim 8, wherein the operating system is further configured to produce a position model describing the relative locations of each at least a portion of the plurality of audio input devices, the position model being based at least in part on at least a portion of the analysis.

15. The system of claim 13 and claim 14, wherein the audio content is based at least in part on the position model.

16. A method for utilizing multiple microphones for synchronized and position-based audio, comprising the steps of:
   receiving, at a media computing device comprising a processor, a memory, a plurality of wireless network interfaces, an audio controller configured to transmit audio content via at least a wireless network interface, and an operating system configured to receive audio input streams from a plurality of audio input devices, analyze at least a portion of the received audio input streams, and direct operation of the audio controller based at least in part on the analysis, a plurality of audio input streams;
   analyzing at least a portion of the received audio input streams;
   producing a position model based at least in part on at least a portion of the analysis results; and
   directing the operation of the audio controller based at least in part on the position model.

* * * * *